Patented Nov. 4, 1941

2,261,371

UNITED STATES PATENT OFFICE 2,261,371

RECOVERY OF TUNGSTIC ACID FROM ITS ORES

Arthur W. Hixson, Leonia, N. J., and Ralph Miller, New York, N. Y., assignors to The Chemical Foundation, Incorporated, a corporation of Delaware No Drawing. Application February 16, 1938, Serial No. 190,752

3 Claims. (Cl. 23—22)

This invention relates to the extraction of tungstic acid from its ores and, more particularly, to the extraction of those tungsten ores which are not amenable to concentration to any large degree by physical methods such as gravity concentration; flotation, magnetic concentration or separation and the like.

Previous methods of treating tungsten ores in order to extract tungstic acid therefrom may be divided into two classes, acid methods and alkali methods. The new methods which we have found to be especially effective are concerned with the application of acid solutions to the treatment of tungsten ores.

Tungsten is usually associated with iron or manganese or both. In some cases the tungsten is associated with manganese dioxide and in other cases with iron oxide. In all previous methods of treating tungsten ores with acid, the function of the acid has been to dissolve the associated minerals and to leave a solid residue of tungstic acid behind. It is well known that tungstic acid is substantially insoluble in all mineral acids except phosphoric acid. We have now found that if an ore containing tungsten associated with large amounts of manganese dioxide is treated with a solution of sulfur dioxide in water not only does the manganese go into solution but all the tungsten associated with the manganese dioxide also dissolves in the solution. This was an unexpected result which is contrary to all the previous knowledge of the behavior of tungsten in acid solutions. For example, in U. S. Patent 1,483,567 a method of treating tungsten ores with dilute sulphuric acid under pressure is described. In this case the function of the sulphuric acid is to dissolve the common impurities, manganese and iron and to leave the tungsten oxides behind (page 1, lines 93 to 99). In British Patent 241,399 (1925) (page 2, lines 110 to 113 inclusive) corresponding to this United States patent, it is stated that sulphurous acid is the equivalent of sulphuric acid.

On the basis of this unpredictable and other unexpected phenomena, a simple, inexpensive method of recovering tungstic acid of a high degree of purity has been found.

Thus, it has been found that when a tungsten ore which has manganese dioxide associated with the tungsten is treated with water through which sulfur dioxide is bubbled, the ore dissolves practically completely. The solution is now separated from any small residue which is insoluble in the sulfur dioxide solution. The solution is boiled, causing the dissolved sulfur dioxide to be liberated and at the same time a white precipitate forms which contains nearly all the tungsten that was in solution. This white precipitate contains some manganese as well as some other metallic constituents which dissolved in the sulfur dioxide solution. The composition of the white precipitate is not of any importance for it has been found that when the white precipitate is digested with nitric acid, the white precipitate dissolves and a yellow solid consisting of pure tungstic acid is formed. The nitric acid solution is easily separated from the yellow solid by filtration completing the recovery of pure tungstic acid.

An equally novel and facile method has been found for the extraction of tungstic acid from ores in which the tungsten is associated with iron oxide. When sulfur dioxide is bubbled through a suspension of the finely divided ore, it is found that practically no decomposition of the ore takes place irrespective of the temperature of the solution if the operation is carried out under atmospheric pressure. Thus the use of sulphurous acid at atmospheric pressure causes no decomposition of the ore. However, we have found that if air is mixed with the sulfur dioxide and the solution maintained between 40° C. and 100° C. the ore is rapidly and completely decomposed. We have found that the presence of a small amount of manganese increases the rate of decomposition of the ore and that the solution of the ferric oxide does not tend to decrease the rate of decomposition of the ore but on the contrary tends to increase the rate of decomposition. Under these circumstances the tungstic acid does not dissolve but remains behind as an insoluble residue. The insoluble residue is separated from the solution and washed. The tungstic acid in the residue is present in a finely divided, hydrated form so that when the residue is treated with an alkaline solution such as ammonium hydroxide, it readily dissolves. The alkaline solution containing the tungsten is then filtered off from the insoluble residue and either neutralized with acid causing pure tungstic acid to precipitate, or, if ammonia is the alkaline agent employed, the solution may be evaporated to form solid ammonium paratungstate which may then be roasted to form pure tungstic acid.

The methods of extracting tungsten from its ores when the tungsten is associated with manganese dioxide or iron oxide that have been described in the foregoing paragraphs have one thing in common. In each case, the only material that is consumed is sulfur dioxide. Because the sulfur dioxide that is consumed may be derived from any source, these methods provide a very inexpensive way of recovering tungstic acid from its ores. There are many variations by which the novel methods that have been described can be employed. The following is an example of how an ore containing tungsten associated with manganese dioxide and iron oxide may be treated.

The ore is finely ground and suspended in water. Sulfur dioxide is then bubbled through the solution. As the sulfur dioxide may be derived from any source, the admixture of any other gas will not affect the reaction. The manganese goes into solution and so does all the tungsten associated with the manganese. The solution is filtered off from the solid residue when all the manganese has gone into solution. This operation has divided the tungsten in the original ore. The tungsten associated with the manganese is now in solution and the tungsten associated with the iron is present in the residue.

The clear solution containing the tungsten and manganese is boiled. The evolved sulfur dioxide is returned to the first step in the process. At the same time a precipitate has formed. The precipitate is filtered off and the hot solution returned, after cooling, to the first step in the process. This solution will tend to become saturated with manganous sulphate so provision must be made to remove the solid manganese sulphate when it forms. The white precipitate is digested with nitric acid causing the precipitate to dissolve and pure solid tungstic acid to form. The tungstic acid is filtered off and the nitric acid solution may be distilled to recover it.

The solid residue from the first part of the process is suspended in water at from 40° to 100° C., and treated with a gaseous mixture of sulfur dioxide and air. Under these conditions the iron dissolves and leaves a residue of tungstic acid and silica. The water solution is separated from the residue by filtration and the residue washed. The residue is treated with an ammonium hydroxide solution and the tungstic acid dissolves, leaving the silica behind. The alkaline solution is filtered off and distilled. On evaporation, ammonium paratungstate is formed. The salt is roasted, forming solid tungstic acid and ammonia which goes off as a gas. The ammonia is absorbed in water and is reused.

Various modifications of this invention may be employed and the scope thereof is to be limited only by the prior art.

We claim:

1. The process of extraction of tungstic acid from ores containing tungsten associated with other metallic constituents which form water soluble sulfates, consisting in treating said ore with sulfur dioxide in the presence of water; separating the solution from the insoluble residue; heating the solution containing the dissolved materials whereby the dissolved sulfur dioxide is liberated and a precipitate containing substantially all the dissolved tungsten is formed; and digesting this precipitate with nitric acid whereby the tungsten content is converted to tungstic acid.

2. In the process of extracting tungstic acid from ores containing tungsten associated with manganese, the steps consisting in treating said ore with sulfur dioxide in the presence of water to dissolve the tungsten; separating the solution from the insoluble residue and heating the solution containing the dissolved materials whereby the dissolved sulfur dioxide is liberated and a precipitate containing substantially all the dissolved tungsten is formed.

3. The process of extraction of tungstic acid from ores containing tungsten associated with manganese dioxide and iron oxide consisting in treating said ore with sulfur dioxide in the presence of water until all the manganese dioxide is dissolved; separating the solution from the insoluble residue; heating the solution containing the dissolved materials whereby the dissolved sulfur dioxide is liberated and a precipitate containing substantially all the dissolved tungsten is formed; and digesting this precipitate with nitric acid whereby the tungsten content is converted to solid tungstic acid; then suspending the aforesaid insoluble residue in water, subjecting this suspension to a mixture of sulfur dioxide and air, whereby the iron content is dissolved and insoluble tungstic acid is formed; separating the dissolved iron from the insoluble residue; treating said residue with an alkaline solution whereby the tungstic acid is dissolved; separating the alkaline solution containing the tungsten from said residue; neutralizing the solution and recovering the tungstic acid.

ARTHUR W. HIXSON.
RALPH MILLER.